Patented June 1, 1943

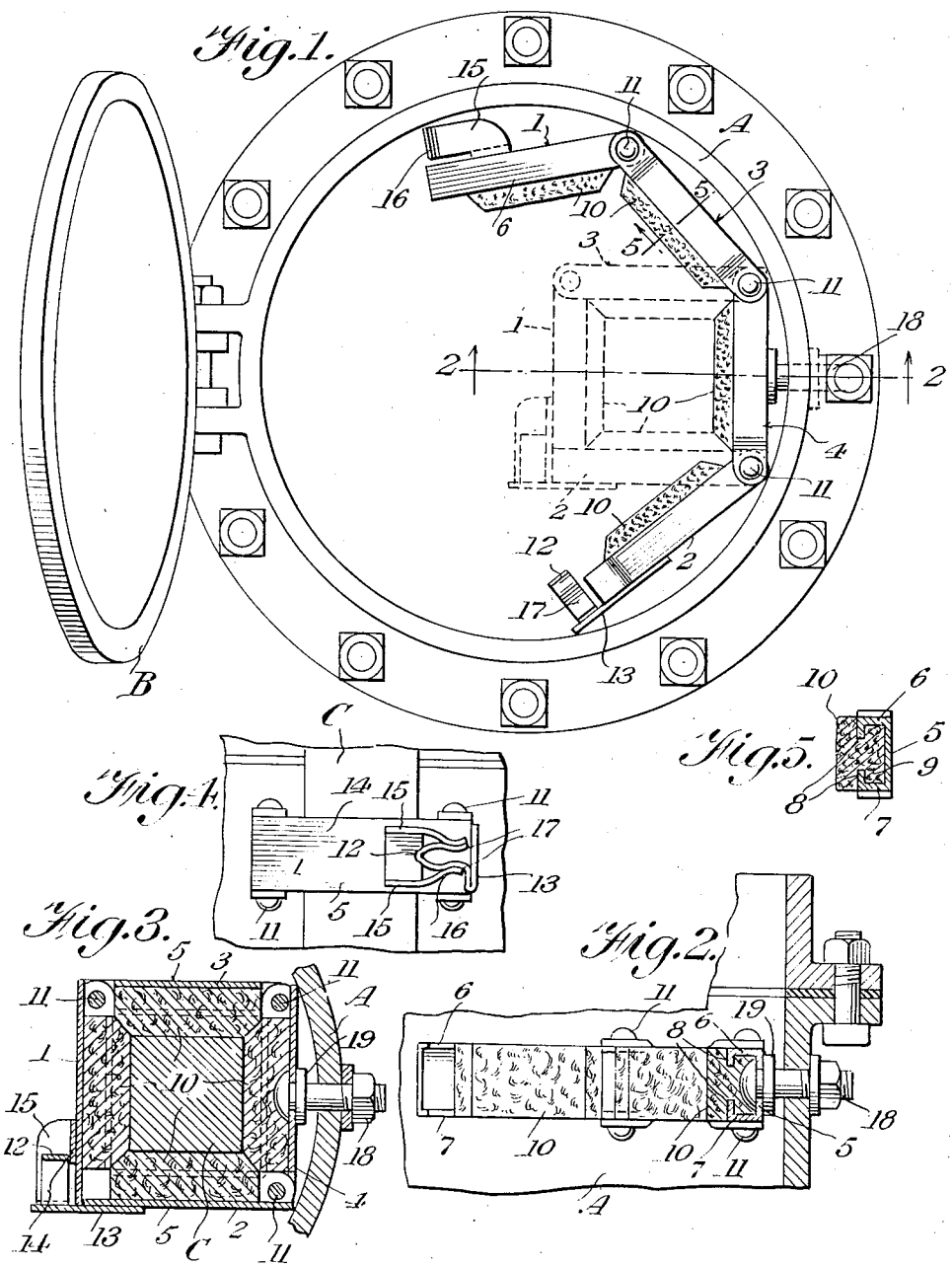

2,320,909

UNITED STATES PATENT OFFICE 2,320,909

GAUGE POLE WIPER

Ray H. Bright, Chase, Kans.

Application February 20, 1942, Serial No. 431,763

1 Claim. (Cl. 15—210)

This invention relates to a gauge pole wiper to be attached within the thief or gauge hatch of a storage tank for oil or other liquid, and an important object of my invention is to provide a wiper that will allow for the free passage of the gauge pole through the hatch when gauging the liquid, in that the wiper is made up of a plurality of wiper sections movable to open or spread position for disposal against the neck of the hatch, when not in use, so as to provide ample room for the pole, and the wiper includes latching means for clamping the sections together in closed position about the pole.

A further object is to provide a gauge pole wiper that can be attached to and within various type hatches now in general use, and by a single bole and nut connection or like fastening means, and the wiper is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a top plan view illustrating my device secured within a tank hatch and with the device in open position in full lines and in closed position in dotted lines.

Figure 2 is a sectional view taken approximately on line 2—2 of Figure 1, with the device in open position.

Figure 3 is a horizontal sectional view taken through the device, in closed position.

Figure 4 is a side elevation looking toward the latching means.

Figure 5 is a sectional view taken approximately on line 5—5 of Figure 1.

Referring to the drawing in detail, the letter A indicates a conventional flanged sectional tank hatch, which is closed by a hinged cover B, and a gauge pole is indicated by the letter C, it being apparent, that it is customary to pass the pole through the hatch to ascertain the depth of liquid within the tank and the quantity is determined by the level line and numbered graduations on the pole.

My device includes an open frame that is made up of four sections in the form shown, there being a pair of end sections 1 and 2 respectively and a pair of intermediate sections 3 and 4 respectively. Each section includes what may be termed a hollow housing element of elongated rectangular formation, which is formed from sheet metal to provide an outer wall 5 and upper and lower walls 6 and 7 respectively, which are formed with inturned flanges 8 extending longitudinally of the outer edges thereof. The flanges cooperate with each other for holding a block like strip 9 of suitable wiping material, such as sponge rubber, felt or the like, within the housing element. The strips are of a length to terminate short of the ends of the housing elements and are of a width to extend a considerable distance outwardly beyond the flanges 8 to provide wiping portions 10. The ends of the strips are preferably beveled as shown, for fitting engagement with each other when the frame is folded or disposed in closed position, as shown in dotted lines in Figure 1, and the strips are preferably formed with longitudinally extending grooves for receiving the flanges therein, as best shown in Figure 5.

The upper and lower walls 6 and 7 of the sections are connected together in end to end overlapped relation by headed pivot pins 11, in a manner so that the intermediate sections are pivotally connected to each other, and the end sections are pivotally connected to the intermediate sections, thus leaving one of the ends of each end section free for movement of the sections relative to each other for disposal in open position, as shown in full lines in Figure 1, or to closed position as shown in dotted lines in that figure, and as the sections are of equal length, they form a square frame when in closed position, for the portions 10 to be disposed in wiping engagement with the four sides of the pole, when the latter is drawn through the frame, as will be apparent from Figure 3.

The sections are held in closed position by latching means which as best shown in Figure 4, includes a looped spring tongue 12 formed on and extending laterally and inwardly from an attaching plate 13 that is welded or otherwise fixed to the outer face of the wall 5 of the end section 2, the plate extending beyond the free end of the section 2 for disposing the tongue in spaced relation thereto, and the tongue has one end free to allow expansion and contraction thereof, as will be apparent. The keeper for the tongue also includes an attaching plate 14 that is fixed to the outer face of the wall 5 of the section 1, and formed on the plate 14 is a pair of spring ears 15 having spaced free portions 16 disposed in the path of the tongue 12, to set up a clamping engagement therewith, the free portions being bowed toward each other and having outwardly flared ends. The tongue is of substantially triangular formation to cooperate with the flared ends of the ears, to facilitate passage of the tongue between the same. The opposite side portions of the tongue are curved toward each other to provide seats 17 for receiving the flared ends of the ears therein.

By the form of latch construction shown, it will be obvious that when the sections are moved to closed position, the latching means will operate automatically for locking the sections accordingly, and that the latching means will be released, merely by moving the sections to open position, yet the latching means will hold the sections in closed position against any possibility of casual separation or displacement.

The frame is fixed to the hatch and of course within the same, by a single bolt and nut connection 18, the bolt extending through the wall 5 of the intermediate section 4, with its head bearing against the inner face thereof and a collar 19 is formed on the bolt to bear against the outer face of the wall 5. The bolt extends through the wall of the lower section of the hatch and is secured thereto by the nut, as clearly shown in Figures 2 and 3.

The frame is normally disposed in open position, as shown in full lines in Figure 1, and when so arranged, allows for free passage of the pole through the hatch. After the quantity of liquid within the tank has been determined, in the usual manner, the pole is again run into the tank and the frame is then clamped about the pole as shown in Figure 3. The pole is then withdrawn from the tank and it will be obvious that passage of the pole through the device will result in the liquid being wiped therefrom, the liquid draining back into the tank, thus it will be seen that my wiper eliminates waste of liquid and maintains the pole and portion of the tank about the hatch in a clean condition.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

A gauge pole wiper for attachment to the hatch of a liquid tank, comprising a substantially square frame including a pair of elongated intermediate open-sided housing sections having one of their ends pivotally connected together and a pair of elongated end open-sided housing sections having one of their ends pivotally connected to the opposite ends of the intermediate sections for movement of the frame to open and closed positions, strips of wiping material secured within the open sides of the sections and extending exteriorly thereof along their length, said strips having beveled ends for fitting engagement of the strips relative to each other when the frame is in closed position, a single bolt and nut connection for securing the frame within the hatch and the bolt being fixed to one of the intermediate sections, and latching means carried by the free ends of the end sections for clamping the sections in closed position about the pole for disposing the wiping material in engagement with the faces thereof.

RAY H. BRIGHT.